(12) United States Patent
Parker et al.

(10) Patent No.: US 11,299,294 B2
(45) Date of Patent: Apr. 12, 2022

(54) AUTOMATED FAULT ISOLATION OF FLIGHT CONTROL SURFACES AND DAMAGE DETECTION OF AIRCRAFT THROUGH NON-CONTACT MEASUREMENT

(71) Applicant: GE Aviation Systems Limited, Cheltenham (GB)

(72) Inventors: Edward Parker, Cheltenham (GB); Stefan Alexander Schwindt, Cheltenham (GB)

(73) Assignee: GE AVIATION SYSTEMS LIMITED, Cheltenham (GB)

( * ) Notice: Subject to any disclaimer, the term of this patent is extended or adjusted under 35 U.S.C. 154(b) by 295 days.

(21) Appl. No.: 16/429,663

(22) Filed: Jun. 3, 2019

(65) Prior Publication Data

US 2019/0375520 A1 Dec. 12, 2019

(30) Foreign Application Priority Data

Jun. 6, 2018 (GB) ...................................... 1809313

(51) Int. Cl.
*B64F 5/60* (2017.01)
*B64D 47/08* (2006.01)
(Continued)

(52) U.S. Cl.
CPC ................ *B64F 5/60* (2017.01); *B64D 47/08* (2013.01); *G07C 5/008* (2013.01); *G07C 5/0816* (2013.01)

(58) Field of Classification Search
CPC ... B64F 5/60; B64D 47/08; B64D 2045/0085; B64D 45/00; G07C 5/008; G07C 5/0816;
(Continued)

(56) References Cited

U.S. PATENT DOCUMENTS

| 5,135,186 A | 8/1992 | Ako |
| 5,281,816 A | 1/1994 | Jacobson et al. |

(Continued)

FOREIGN PATENT DOCUMENTS

| CN | 101484360 A | 7/2009 |
| CN | 201417199 Y | 3/2010 |

(Continued)

OTHER PUBLICATIONS

Jentink, H. W., et al. "In-flight non-intrusive measurement of wing dynamics and of the aileron and flap deflection and deformation." (2015) (Year: 2015).*

(Continued)

*Primary Examiner* — James J Lee
*Assistant Examiner* — Shon G Foley
(74) *Attorney, Agent, or Firm* — Amin, Turocy & Watson, LLP

(57) ABSTRACT

Systems, computer-implemented methods and/or computer program products that facilitate automating fault isolation of flight control surfaces and damage detection of aircraft are provided. In one embodiment, a system 100 utilizes a processor 102 that executes computer implemented components stored in memory 104. One or more sensors 106 monitor wing and flight control surface from one or more vantage points to obtain full coverage of the wing. A machine vision component 108 assesses condition of the wing and the flight control surface based on results of the one or more sensors 106. A spectrographic component 110 detects leaks by monitoring airflow for traces of fuel or hydraulic fluid.

20 Claims, 10 Drawing Sheets

(51) Int. Cl.
  *G07C 5/00* (2006.01)
  *G07C 5/08* (2006.01)
(58) Field of Classification Search
  CPC .. G01M 5/0016; G01M 5/0091; G01M 3/202; G01M 3/04; G01B 11/16; G01B 21/32; G01N 21/88
  See application file for complete search history.

(56) References Cited

U.S. PATENT DOCUMENTS

| | | | |
|---|---|---|---|
| 5,283,643 A | | 2/1994 | Fujimoto |
| 7,085,655 B2* | | 8/2006 | Ferrer .................. B64C 27/006 702/35 |
| 8,000,845 B2 | | 8/2011 | Fabre-Raimbault |
| 8,333,348 B1 | | 12/2012 | Miller |
| 9,031,311 B2 | | 5/2015 | Tillotson |
| 9,242,723 B2 | | 1/2016 | Wildschek |
| 9,567,105 B2 | | 2/2017 | Alber |
| 9,802,693 B2 | | 10/2017 | Yeeles |
| 2006/0136102 A1 | | 6/2006 | Burner |
| 2007/0076209 A1* | | 4/2007 | Baer .................. G01N 21/3504 356/454 |
| 2008/0265104 A1 | | 10/2008 | Fabre-Raimbault |
| 2009/0157239 A1 | | 6/2009 | Walton |
| 2009/0309762 A1 | | 12/2009 | Wolcken et al. |
| 2010/0064773 A1* | | 3/2010 | Meredith .............. G01M 3/047 73/40 |
| 2010/0076624 A1 | | 3/2010 | Hinnant |
| 2015/0090007 A1 | | 4/2015 | Redman et al. |
| 2015/0247953 A1 | | 9/2015 | O'Brien |
| 2017/0148102 A1* | | 5/2017 | Franke ............... G06Q 30/0278 |
| 2017/0259943 A1* | | 9/2017 | Fleck ....................... B64F 5/60 |
| 2017/0315564 A1 | | 11/2017 | Thomas |
| 2018/0079533 A1 | | 3/2018 | Suchezky et al. |
| 2018/0099740 A1 | | 4/2018 | Provost |
| 2018/0099761 A1 | | 4/2018 | Griffiths et al. |
| 2018/0171975 A1* | | 6/2018 | Rohm ..................... B64C 9/20 |

FOREIGN PATENT DOCUMENTS

| | | | | |
|---|---|---|---|---|
| CN | 102132137 A | | 7/2011 | |
| CN | 103364142 A | | 10/2013 | |
| CN | 205844905 U | | 12/2016 | |
| CN | 107271090 A | | 10/2017 | |
| CN | 206649349 U | | 11/2017 | |
| EP | 0953503 A2 | | 11/1999 | |
| EP | 2615026 A1 | | 7/2013 | |
| EP | 3101504 A2 | | 12/2016 | |
| GB | 2398771 A | * | 9/2004 | ......... B64D 45/0005 |
| RU | 2649215 C1 | | 3/2018 | |

OTHER PUBLICATIONS

Communication pursuant to Article 94(3) EPC for European Patent Application No. 19 177 988.3 dated Oct. 19, 2020, 5 pages.
Examination Report under Section 18(3) for United Kingdom Application No. GB1809313.8 dated Oct. 22, 2020, 5 pages.
Combined Search and Examination Report under Sections 17 and 18(3) received for United Kingdom Application No. GB1809313.8 dated Nov. 30, 2018, 8 pages.
Communication pursuant to Article 94(3) EPC received for European Patent Application No. 19177988.3 dated May 14, 2021, 6 pages.
Extended European search report received for European Patent Application No. 19177988.3 dated Oct. 31, 2019, 24 pages.
Communication pursuant to Rule 69 EPC received for European Patent Application No. 19177988.3 dated Dec. 16, 2019, 2 pages.
Second Office Action received for Chinese Patent Application Serial No. 201910493345.8 dated May 6, 2021, 15 pages (Including English Translation).
First Office Action and Search report received for Chinese Patent Application Serial No. 201910493345.8 dated Nov. 30, 2020, 9 pages.
Office Action received for Chinese Patent Application Serial No. 201910493345.8 dated Aug. 30, 2021, 6 pages.
Communication under Rule 71(3) EPC received for European Patent Application Serial No. 19177988.3 dated Dec. 1, 2021, 45 pages.
Notice of Acceptance received for Chinese Patent Application Serial No. 201910493345.8 dated Dec. 21, 2021, 2 pages (Including English Translation).

* cited by examiner

US 11,299,294 B2

AUTOMATED FAULT ISOLATION OF FLIGHT CONTROL SURFACES AND DAMAGE DETECTION OF AIRCRAFT THROUGH NON-CONTACT MEASUREMENT

CROSS-REFERENCE TO RELATED APPLICATIONS

This application claims the benefit of earlier filing date and right of priority to United Kingdom Application No. 1809313.8, filed on Jun. 6, 2018, the contents of which are hereby incorporated by reference herein in its entirety.

TECHNICAL FIELD

The subject disclosure relates to systems, computer-implemented methods and/or computer program products facilitating automating fault isolation of flight control surfaces and damage detection of aircraft, and more specifically, automating fault isolation of flight control surfaces and damage detection of aircraft through non-contact measurement.

SUMMARY

The following presents a summary to provide a basic understanding of one or more aspects of the invention. This summary is not intended to identify key or critical elements, or delineate any scope of the particular aspects or any scope of the claims. Its sole purpose is to present concepts in a simplified form as a prelude to the more detailed description that is presented later. In one or more aspects described herein, devices, systems, computer-implemented methods, apparatus and/or computer program products that facilitate automating fault isolation of flight control surfaces and damage detection of aircraft are described.

According to one aspect, a system is provided. The system can comprise a memory that stores computer executable components. The system can also comprise a processor, operably coupled to the memory, and that can execute computer executable components stored in the memory. The computer executable components can comprise one or more sensors that monitor wing and flight control surface from one or more vantage points to obtain full coverage of the wing. The computer executable components can further comprise a machine vision component that assesses condition of the wing and the flight control surface based on results of the one or more sensors. The computer executable components can further comprise a spectrographic component that detects leaks by monitoring airflow for traces of fuel or hydraulic fluid.

According to another aspect, a computer-implemented method is provided. The computer-implemented method can comprise monitoring, by a system operatively coupled to a processor, wing and flight control surface from one or more vantage points to obtain full coverage of the wing. The computer-implemented method can further comprise assessing, by the system, condition of the wing and the flight control surface based on results of the one or more sensors. The computer-implemented method can further comprise detecting, by the system, leaks by monitoring airflow for traces of fuel or hydraulic fluid.

According to another aspect, a computer program product for facilitating automating fault isolation of flight control surfaces and damage detection of aircraft is provided. The computer program product can comprise a computer readable storage medium having program instructions embodied therewith. The program instructions can be executable by a processor to cause the processor to monitor wing and flight control surface from one or more vantage points to obtain full coverage of the wing. The program instructions can further be executable by a processor to assess condition of the wing and the flight control surface based on results of the one or more sensors. The program instructions can further be executable by a processor to detect leaks by monitoring airflow for traces of fuel or hydraulic fluid.

DETAILED DESCRIPTION

Figure 1:
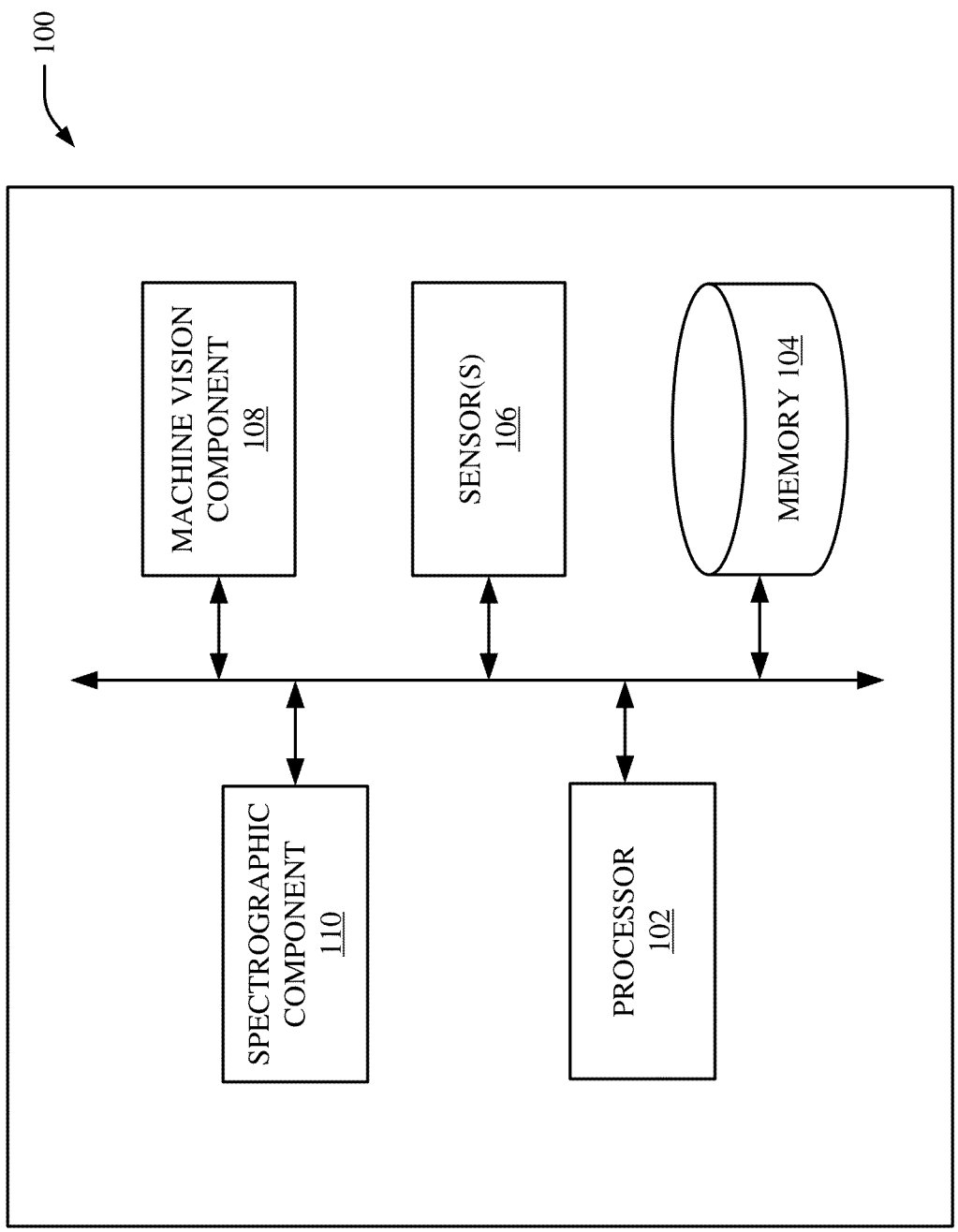
FIG. 1 illustrates a block diagram of an example, non-limiting system facilitating automating fault isolation of flight control surfaces and damage detection of aircraft in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

One or more embodiments described herein can facilitate automating fault isolation of flight control surfaces and damage detection of aircraft through non-contact measurement. Embodiments described herein can employ machine vision to automatically locate damages and notify flight crew or cabin crew. Machine vision can employ sensor data from one or more sensors to monitor an aircraft. One or more sensors can monitor wings, flight control surfaces, tailplane, landing gears, tires and other parts of an aircraft. For example, one or more sensors can monitor actual deflection of flight control surfaces to be compared with demanded deflection to identify location of failure (e.g., fault isolation). In addition, a spectroscopy analysis can monitor airflow for traces of fuel or hydraulic fluid to indicate a leak. Although wings of an aircraft are used throughout as an example, it is appreciated that embodiments and implementations described herein can also be used for fault isolation and damage detection of other parts of an aircraft.

Damage to wing and flight control surface can have significant impact on flight performance Damage can occur to wing and flight control surface of an aircraft for multiple reasons such as bird strike and impact from other foreign objects. Flight control surfaces can also fail for other reasons. The wing and flight control surface can be monitored from one or more vantage points to have coverage of the whole wing. Different type of sensors can be used to collect data and monitor an aircraft for damage. For example, cameras can be capable of infrared for vision in all conditions (e.g., darkness, fog, rain, etc.) or sufficient lighting can be made available. Additionally, or alternatively, lidar, radar or ultrasound can be used to monitor discrete points. In another implementation, electromechanical sensors or digital sensors such as strain gauges or fiber Bragg grating can also be embedded (e.g., in the wing surface) for further monitoring. Results from sensors can be combined with machine vision algorithms to detect changes in wing shape indicative of damage such as that from bird strike or from other foreign objects. Inputs to flight control surfaces can be used to compare between actual deflections and demanded deflections (e.g., commanded deflections) of the flight control surfaces. If actual deflection deviates from demanded deflection, this information can be used to identify where failure occurs. In yet another embodiment, placement of spectrometers downstream can monitor airflow for traces of fuel or hydraulic fluid indicative of leaks even if there is no visible signs of failure or damage to the wing or flight control surface.

FIG. 1 illustrates a block diagram of an example, non-limiting system 100 facilitating automating fault isolation of flight control surfaces and damage detection of aircraft in accordance with one or more embodiments described herein. Aspects of systems (e.g., system 100 and the like), apparatuses or processes explained in this disclosure can constitute one or more machine-executable components embodied within one or more machines, e.g., embodied in one or more computer readable mediums (or media) associated with one or more machines. Such components, when executed by the one or more machines, e.g., computers, computing devices, virtual machines, etc., can cause the machines to perform the operations described.

In various embodiments, system 100 can be any suitable type of component, machine, device, facility, apparatus, and/or instrument that comprises a processor. In some embodiments, system 100 is capable of effective and/or operative communication with a wired and/or wireless network. Components, machines, apparatuses, devices, facilities, and/or instrumentalities that can comprise the system 100 can include, but are not limited to, tablet computing devices, handheld devices, server class computing machines and/or databases, laptop computers, notebook computers, desktop computers, cell phones, smart phones, consumer appliances and/or instrumentation, industrial and/or commercial devices, digital assistants, multimedia Internet enabled phones, multimedia players, and the like.

As illustrated in FIG. 1, system 100 can comprise processor 102, memory 104, sensors 106, machine vision component 108 and/or spectrographic component 110. The processor 102 can execute computer executable components stored in memory 104. It is to be appreciated that in some embodiments one or more system components can communicate wirelessly with other components, through a direct wired connection or integrated on a chipset.

In one or more embodiments described herein of system 100, predictive analytics can be used to automatically generate one or more models used by the system 100 to facilitate classifying type of damage and identifying cause of damage. For example, determination of type of damage and cause of damage can be based on information retained in a knowledgebase. As used herein, the term "knowledgebase" can be a database or other storage location or repository that can store one or more types of information. All such embodiments are envisaged.

The knowledgebase can comprise information related to sensor data (e.g., results from the one or more sensors). In some embodiments, information related to sensor data can be gathered over time and retained in the knowledgebase. Based on obtained information, system 100 can evaluate the knowledgebase (or multiple knowledgebases) and generate one or more patterns and/or can map information known about the sensor data to the information known about other sensor data. Predictive analytics of system 100 can determine that, if information of the sensor data is similar to other sensor data, the sensor data of the similar sensor data can be utilized to facilitate classifying type of damage and identifying cause of damage.

The computer processing systems, computer-implemented methods, apparatus and/or computer program products described herein can employ hardware and/or software to generate models that are highly technical in nature, that are not abstract and that cannot be performed as a set of mental acts by a human. For example, one or more embodiments can perform significant and complex interpretation and analysis on a copious amount of available information to generate models and determine which models from the one or more models should be utilized to analyze the sensor data. In another example, one or more embodiments can perform predictive analytics on a large amount of data to facilitate classifying type of damage and identifying cause of damage with a high level of accuracy, even in the absence of detailed knowledge about the sensor data. Accuracy can be evaluated by comparing a training set with a test set. After training a model employing a training set, accuracy can be calculated using a test set by computing percentage of output generated by the model running on training set elements that match a predicted target.

In various embodiments, sensors 106 can monitor wings, flight control surfaces, tail-plane, landing gears, tires and other parts of an aircraft. In an example implementation, sensors 106 can monitor wing and flight control surface from one or more vantage points to obtain full coverage of an entire wing. As used herein the term "sensors 106" can mean one or more sensors. The sensors 106 can be cameras that employ infrared for vision analysis in low visibility conditions such as darkness, fog, rain, etc. Cameras can capture the full field image of the wing or the whole wing. Monitored images from a camera can further provide additional data for assessing condition of the wing and flight control surface. For example, a hole in the wing may deform or disable deflection of flight control surface, but it can also cause fuel leaks or hydraulic fluid leaks. Use of cameras can enhance early fault isolation or damage detection that one or more other sensors 106 has not picked up.

Additionally, or alternatively, sensors 106 can utilize at least one of: lidar, radar or ultrasound. Lidar sensors, radar sensors or ultrasound sensors can be employed to monitor discrete points, rather than full field images. For example, lidar sensors, which stands for light detection and ranging, can illuminate a targeted area with pulsed laser light to determine shape of the wing or flight control surface to detect deformation or damage. Pulsed laser light from the lidar sensors can provide sufficient lighting for detection in low visibility conditions without requiring an additional light source. Radar sensors, which stands for radio detection and ranging, can use radio waves to determine direction and distance of a targeted area to determine shape of the wing or flight control surface to detect deformation or damage. Radar sensors can transmit radio signals and receive reflected radio waves, which can be processed to translate into shapes. Ultrasound sensors can transmit ultrasound waves and detect reflected waves to determine shape of the wing or flight control surface to detect deformation or damage. Although lidar sensors has its own light source, it can detect as much as its pulsed laser light is projected. Radar sensors and ultrasound sensors, being that they use various waves, require some processing to determine shape. With a camera, full image (e.g., full field image) can be obtained, but additional lighting may be required for low visibility conditions. Added light sources can also provide additional information such as 3-dimensional information using laser (light amplification by stimulated emission of radiation) illumination that can create speckle patterns.

In some embodiments, sensors 106 can be electromechanical sensors or digital sensors. Examples of electromechanical sensors or digital sensors can be strain gauges or fiber Bragg grating. Strain gauges and fiber Bragg grating sensors can be embedded in a wing surface to detect wing damage. It is appreciated that electromechanical sensors or digital sensors can also be embedded in the tail-plane or other parts of an aircraft for damage detection. Strain gauges can detect electrical resistance to changes in shape of an aircraft surface such as a wing surface. Fiber Bragg grating sensors can detect deformation based on modulation of reflected light.

Sensors 106 can be acoustic sensors that monitor sound signature of the wing and flight control surface to detect damage. Acoustic sensors can be used to detect deformation or damage in wing and flight control surface because sound signature can be deviated as shape of the wing and flight control surface changes. Under normal conditions, airflow can have a certain sound signature which can change as shape of the wing and flight control surface changes. Deformation or damage in the wing can result in a more turbulent airflow which can change sound signature. Changes in sound signature can be detected based on an increased noise level. If there are any drastic changes in shape of the wing, noise level can increase as airflow can become more turbulent. Acoustic sensors can be distributed over the wing or other parts of an aircraft to localize changes in noise level to determine location of deformation or damage. Sound signature can be different for different types of aircraft. For example, a larger wingspan has a larger wing deflection, which can affect the shapes and sound signature of the wing. Sound signature for an aircraft can vary depending on weather conditions. Additionally, sound signature can vary depending on flight performance of an aircraft such as speed, attitude, engine settings, deflection of flight control surfaces, etc.

Sensors 106 can also be used to monitor flight control surfaces. The sensors 106 can monitor deflection (e.g., angle of deflection) of flight control surfaces to detect when actual deflection deviates from demanded deflection, e.g., commanded by a pilot. The sensors 106 can also monitor the landing gears to ensure safe landing. The sensors 106 can also enable assessment of tires on landing gears as well. Landing gears do not always come out correctly. Landing gears can sometimes come out only partially, which can fail to fully support a landing aircraft. Malfunctioning landing gears can cause fire sparks as it scrapes against a runway or cause an aircraft to crash into the ground. If a pilot knows that the landing gears did not fully extend properly, the pilot can pull the landing gears back in and reextend the landing gears to hopefully fix the issue.

Machine vision component 108 can assess condition of wings and flight control surfaces based on results from one or more sensors 106. For example, machine vision component 108 can determine location of damage based on images or sounds produced by the sensors 106. The machine vision component 108 can also classify type of damage and identify cause of damage. For example, machine vision component 108 can employ machine learning to learn and classify type of damage, whether the damage is a dent, crack, leaks, etc. More specifically, the machine vision component 108 can employ machine learning to learn type of damage and cause of damage and to build models that can enhance assessment of future damages. The machine vision component 108 can employ machine learning to classify aircraft type, size and year manufactured. The machine vision component 108 can factor characteristics of aircrafts along with deformation throughout different sections of an aircraft to determine whether it is within accessible range. For example, larger wingspan can have larger wing deflection. An aircraft may keep flying with a small scratch or dent but may need to make an emergency landing if there is a fuel leak.

The machine vision component 108 can employ different sensors 106 to monitor wing and flight control surface. The different sensors 106 can be electromechanical sensors, digitals sensors, cameras, lidar sensors, radar sensors, ultrasound sensors, strain gauges, fiber Bragg grating sensors, spectrometers, etc. The machine vision component 108 can employ a combination of different sensors 106 and use feedback from flight control systems or flight management systems to identify the location and extent of deformation or damage to flight control surfaces. For example, the machine vision component 108 can use inputs to flight control surface to compare actual deflection and demanded deflection to identify location of failure as a function of deviation of actual deflection from demanded deflection. More specifically, the machine vision component 108 can use the images captured by cameras (e.g., sensors 106) to determine degree of actual deflection of flight control surface and compare it with demanded deflection. As a result, machine vision component 108 can localize the defect and inform flight crew or cabin crew of the damage or deformation. The machine vision component 108 can also identify location of deformation or damage based on location and direction of the sensors 106, distance from the sensors 106 to targeted area and full field image.

In addition, the machine vision component 108 also classify type of damage and degree of damage. The machine vision component 108 can classify whether the damage is a dent, crack, hole, etc., and the extent of the damage including how much longer the aircraft can fly. If there is a small dent, the aircraft may be able to keep flying to its designated landing location. If the damage is a huge hole with fuel leakage, the aircraft should make an emergency landing as soon as possible. It is appreciated that machine learning can also be employed to reconfigure an aircraft to respond to identified damages; e.g., reconfigure an aircraft or aircraft control. For example, ensuring same wing configuration (e.g., retract flaps, slats or other flight control surfaces to reduce asymmetry) or change the flight control logic so that a pilot can use stick or yoke the same way but that flight control surfaces response changes to provide the same response to pilot input.

The machine vision component 108 can transmit assessment data into a cloud to enhance learning capabilities. An aircraft can transmit assessment data into the could while there is Internet signals especially while the aircraft is on ground. Multiple aircrafts of different class, type and size can transmit assessment data into the cloud. The cloud-based analysis can employ machine learning to analyze data from a significant number of aircraft at one time and update the models that can be used to make predictive analysis both in the cloud and onboard. For example, the sensor data can be processed in a cloud-based assessment or the sensor data can also be processed onboard using the updated models. The models or machine learning can enable the machine vision component 108 to promptly and accurately assess condition of the aircraft. For example, the models or machine learning can train or learn sound signature of an aircraft under different weather conditions or what is an acceptable sound for an aircraft that has collected debris over time. Acoustic data can be used to generate aerodynamic models for further in-depth analysis. Machine vision component 108 can analyze sensor data from different sensors 106 in combination with different models to determine the condition of the aircraft and better configure the flight control system to compensate for any deformation. For example, if the tailplane broke off, the pilot can configure the flight control system to compensate for the missing part.

Fuel or hydraulic fluid can leak without any immediately apparent visible signs of deformation or damage. Spectrographic component 110 can detect leaks by monitoring airflow for traces of fuel or hydraulic fluid. The spectrographic component 110 can be a spectrometer that can perform spectroscopy analysis to identify if moisture coming off the wing is water or fuel or hydraulic fluid. Detection of fuel or hydraulic fluid leakage by the spectrographic component 110 does not require noticeably visible deformation to the aircraft. Therefore, the spectrographic component 110 can detect fuel or hydraulic fluid leakage before the sensors 106 can detect that there is damage.

Embodiments of devices described herein can employ artificial intelligence (AI) to facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect) described herein, one or more components can examine an entirety or a subset of data to which it is granted access and can provide for reasoning about or determine states of a system, environment, etc. from a set of observations as captured via events and/or data. Determinations can be employed to identify a specific context or action, and/or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=$confidence (class). Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 2:
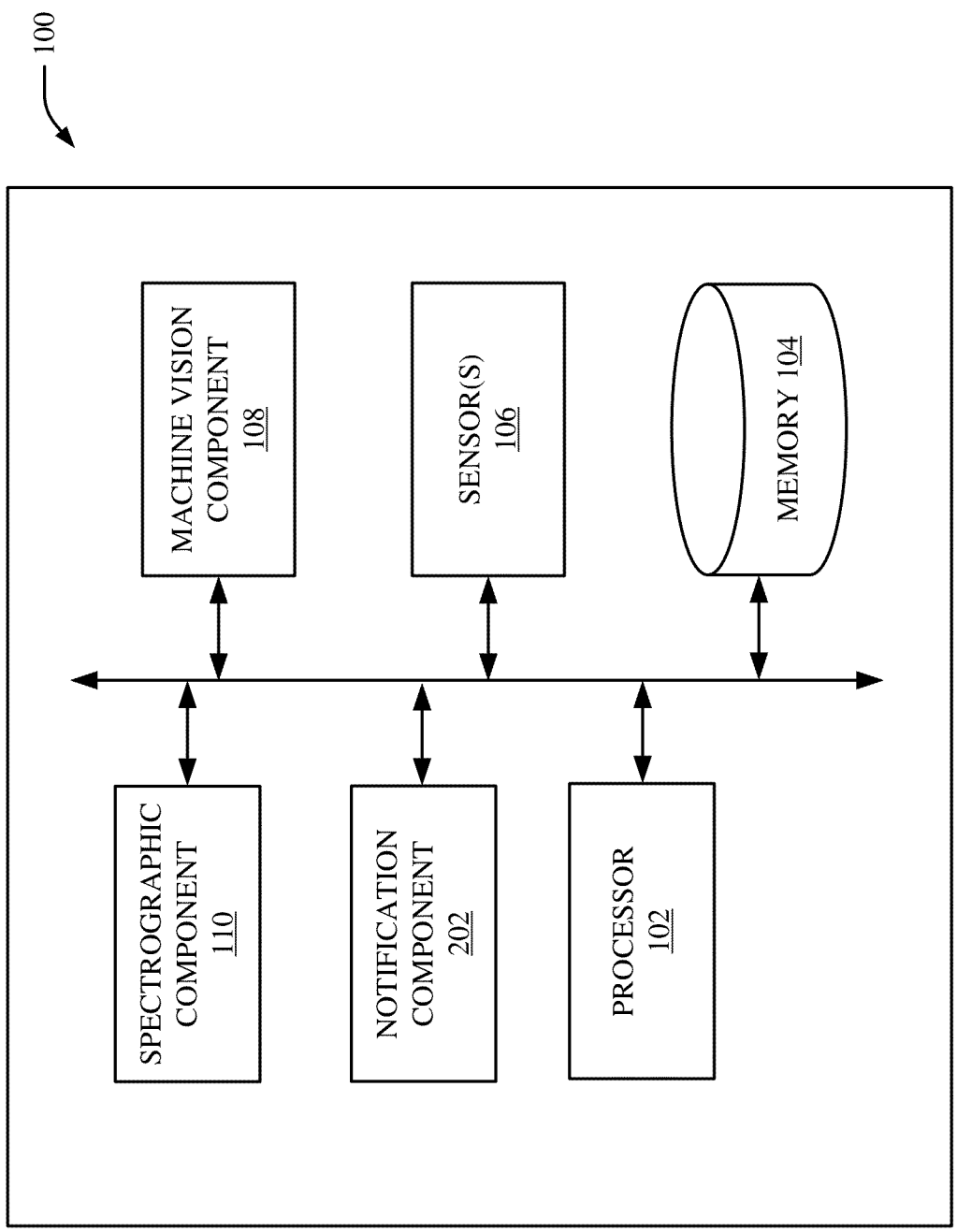
FIG. 2 illustrates a block diagram of an example, non-limiting system facilitating automating fault isolation of flight control surfaces and damage detection of aircraft including a notification component in accordance with one or more embodiments described herein.

FIG. 2 illustrates a block diagram of an example, non-limiting system 100 facilitating automating fault isolation of flight control surfaces and damage detection of aircraft including a notification component 202 in accordance with one or more embodiments described herein. Repetitive description of like elements employed in other embodiments described herein is omitted for sake of brevity. Sensors 106 can monitor wings, flight control surfaces and other parts of an aircraft. The sensors 106 can send sensor data to machine vision component 108 for further analysis. The machine vision component 108 can assess the wings and flight control surfaces based on sensor data from one or more sensors 106. If machine vision component 108 determines that an aircraft is deformed or damaged, the notification component 202 can automatically notify the damage to flight crew or cabin crew.

Notification component 202 can inform the flight crew or cabin crew of type of damage, cause of damage and extent of damage. For example, the notification component 202 can inform the flight crew or cabin that a bird hit the flight control surface causing a faulty deflection, but the aircraft can otherwise continue to its designated arrival location. In another example, the notification component 202 can inform the flight crew or cabin crew that there is a fuel leakage and an emergency landing is advised.

Figure 3:
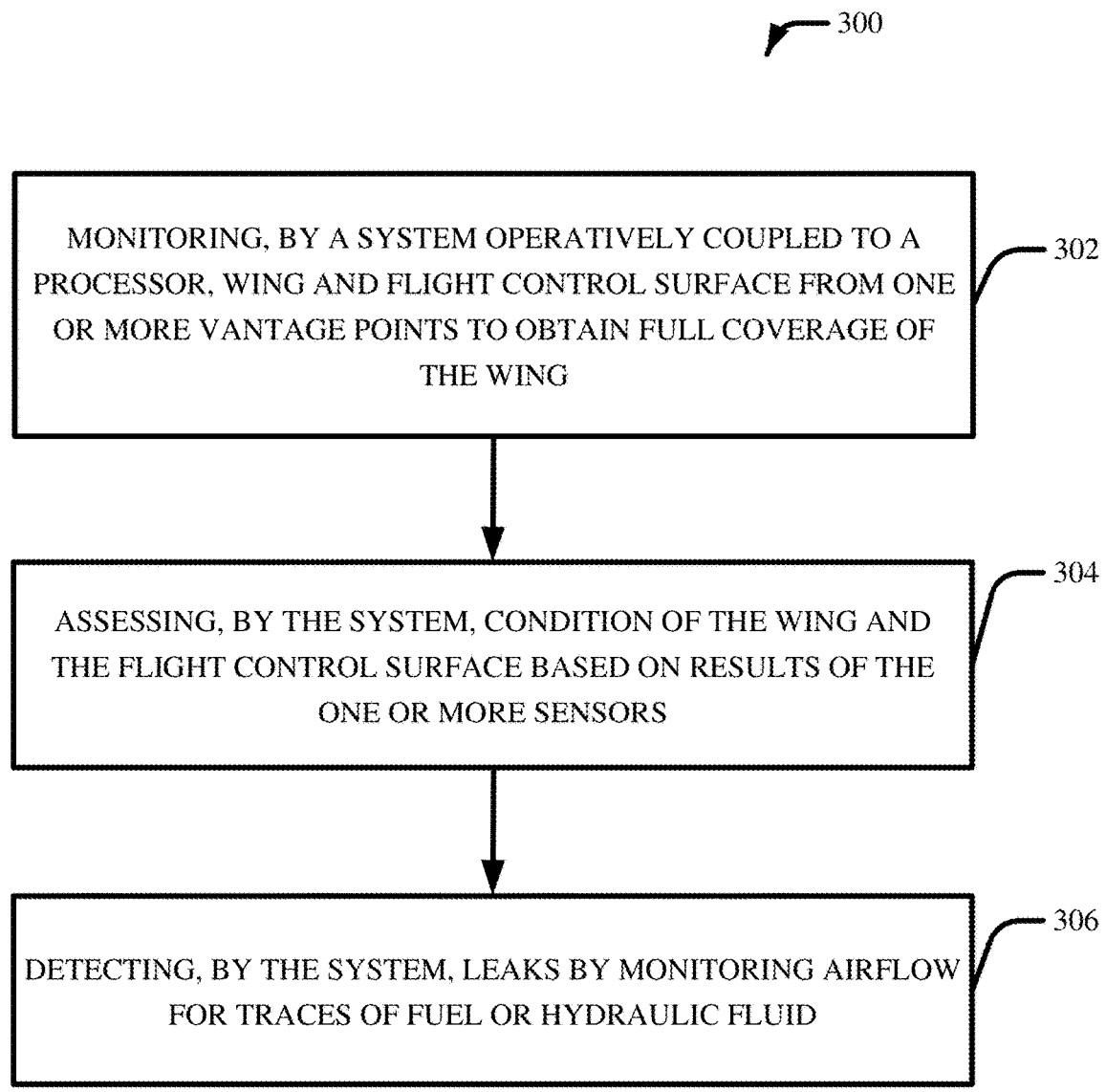
FIG. 3 illustrates an example, non-limiting computer-implemented method facilitating automating fault isolation of flight control surfaces and damage detection of aircraft in accordance with one or more embodiments described herein.

FIG. 3 illustrates an example, non-limiting computer-implemented method 300 facilitating automating fault isolation of flight control surfaces and damage detection of aircraft in accordance with one or more embodiments described herein. Repetitive description of like elements employed in other embodiments described herein is omitted for sake of brevity. At 302, the computer-implemented method 300 can comprise monitoring (e.g., via the one or more sensors 106), by a system operatively coupled to a processor, wing and flight control surface from one or more vantage points to obtain full coverage of the wing. At 304, the computer-implemented method 300 can comprise assessing (e.g., via the machine vision component 108), by the system, condition of the wing based on results of the one or more sensors. At 306, the computer-implemented method 300 can comprise detecting (e.g., via the spectrographic component 110), by the system, leaks by monitoring airflow for traces of fuel or hydraulic fluid.

Figure 4:
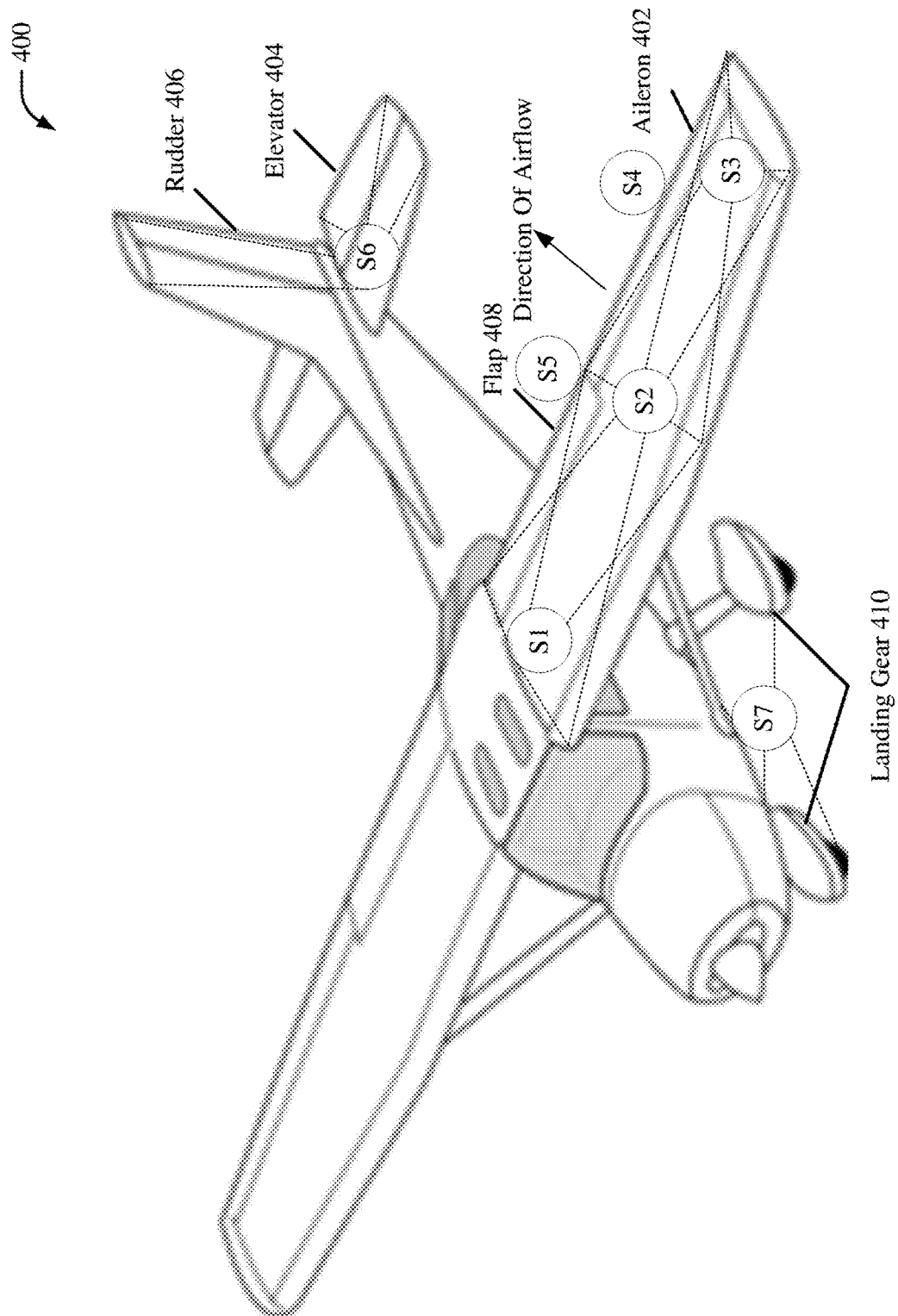
FIG. 4 illustrates a drawing of an example, non-limiting aircraft sensor placement facilitating automating fault isolation of flight control surfaces and damage detection of aircraft in accordance with one or more embodiments described herein.

FIG. 4 illustrates a drawing of an example, non-limiting aircraft sensor placement 400 facilitating automating fault isolation of flight control surfaces and damage detection of aircraft in accordance with one or more embodiments described herein. Repetitive description of like elements employed in other embodiments described herein is omitted for sake of brevity. A pilot can move or change the angle of deflection flight control surfaces (e.g., aileron 402, elevator 404, rudder 406 and flap 408) to control the attitude or orientation of an aircraft as well as increase lift and drag. The aileron 402 can change roll, the elevator 404 can change pitch, the rudder 406 can change yaw, and the flap 408 can increase lift and drag.

The sensors (e.g., sensors 106) can be placed at a number of locations on an aircraft for full coverage of the wing or flight control surface to monitor proper functioning. For example, the sensor S1 can be placed on the wing near the fuselage or body of the aircraft. The sensor S2 can be placed in the center of the wing. The sensor S3 can be placed at the wing tip. The sensors S1, S2 and S3 can provide for full coverage of the wing. For example, the sensors S1, S2 and S3 can monitor the wing for dents, holes, cracks, leakages, etc. The sensors S1, S2 and S3 can also monitor the flight control surfaces such as the aileron 402 and flap 408. The machine vision component 108 can compare the actual deflection and demanded deflection of flight control surfaces to detect failure and identify location of failure (e.g., fault isolation). The sensors S4 and S5 can be spectrometers (e.g., spectrographic component 110) placed on the downstream to monitor airflow for traces of fuel leaks or hydraulic fluid leaks. The sensor S6 can monitor the flight control surfaces at the tail. The sensor S6 can monitor the elevator 404 and rudder 406. The sensor S7 can monitor the landing gear 410. Depending on the type and size of the aircraft, the number of sensors, type of sensors, and placement of the sensors can be modified. The sensors S1, S2, S3, S6 and S7 can be cameras, lidar sensors, radar sensors, ultrasound sensors, electromechanical sensors or digital sensors. It is appreciated that sensors can be placed under the wing and on other parts of an aircraft.

Figure 5:
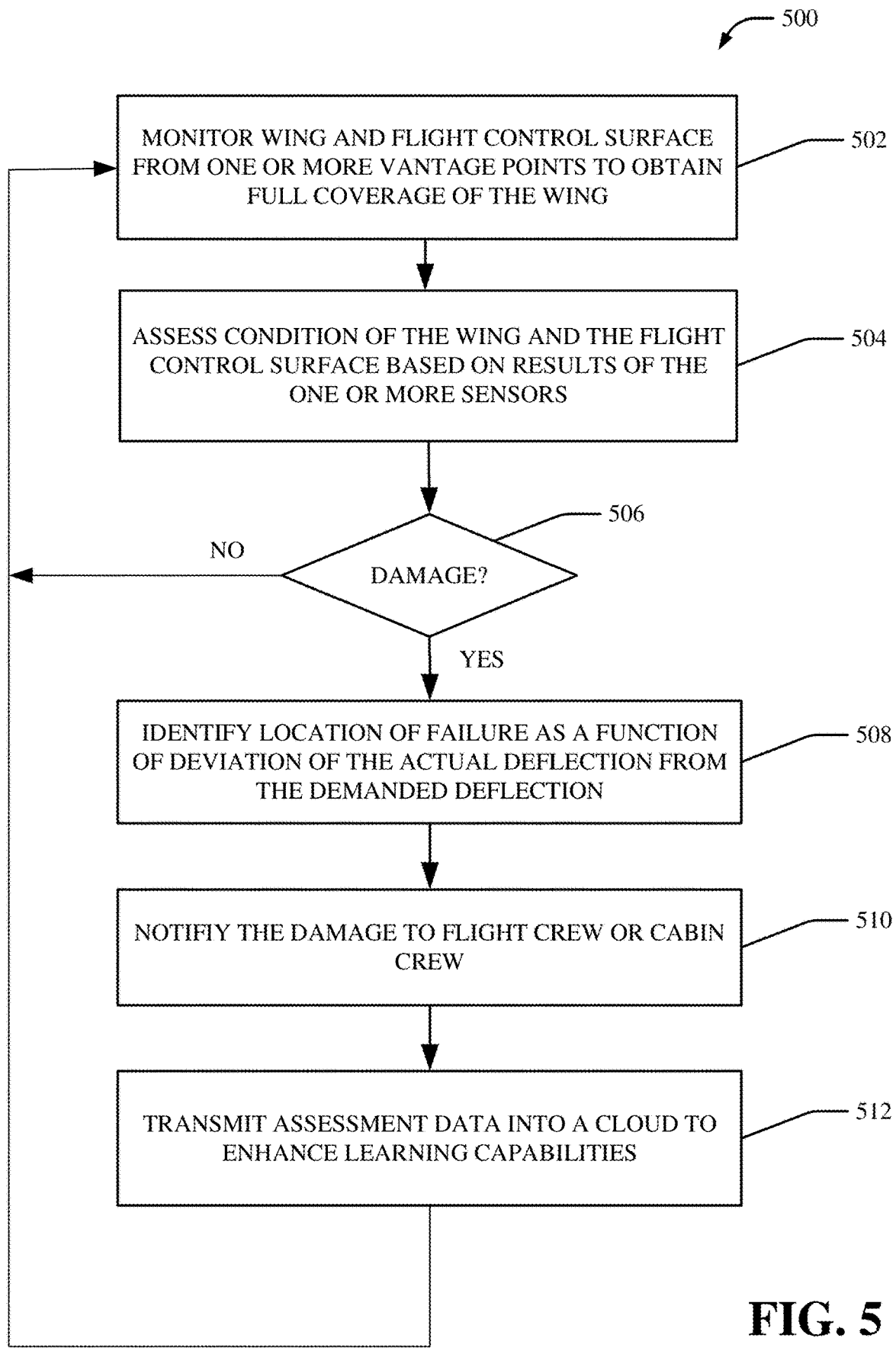
FIGS. 5-8 illustrate example, non-limiting computer-implemented methods facilitating automating fault isolation of flight control surfaces and damage detection of aircraft in accordance with one or more embodiments described herein.

FIG. 5 illustrates an example, non-limiting computer-implemented method 500 facilitating automating fault isolation of flight control surfaces and damage detection of aircraft in accordance with one or more embodiments described herein. Repetitive description of like elements employed in other embodiments described herein is omitted for sake of brevity. At 502, the computer-implemented method 500 can comprise monitoring (e.g., via the sensors 106) wing and flight control surface from one or more vantage points to obtain full coverage of the wing. At 504, the computer-implemented method 500 can comprise assessing (e.g., via the machine vision component 108) condition of the wing and the flight control surface based on results of the one or more sensors 106. At 506, the computer-implemented method 500 can comprise determining (e.g., via the machine vision component 108) whether there is damage. If no, the process returns to 502. If yes, the process proceeds to 508. At 508, the computer-implemented method 500 can comprise identifying (e.g., via the machine vision component 108) location of failure as a function of deviation of the actual deflection from the demanded deflection (e.g., deflection of the flight control surface). At 510, the computer-implemented method 500 can comprise notifying (e.g., via the notification component 202) the damage to flight crew or cabin crew. At 512, the computer-implemented method 500 can comprise transmitting (e.g., via the machine vision component 108) assessment data into a cloud to enhance learning capabilities.

Figure 6:
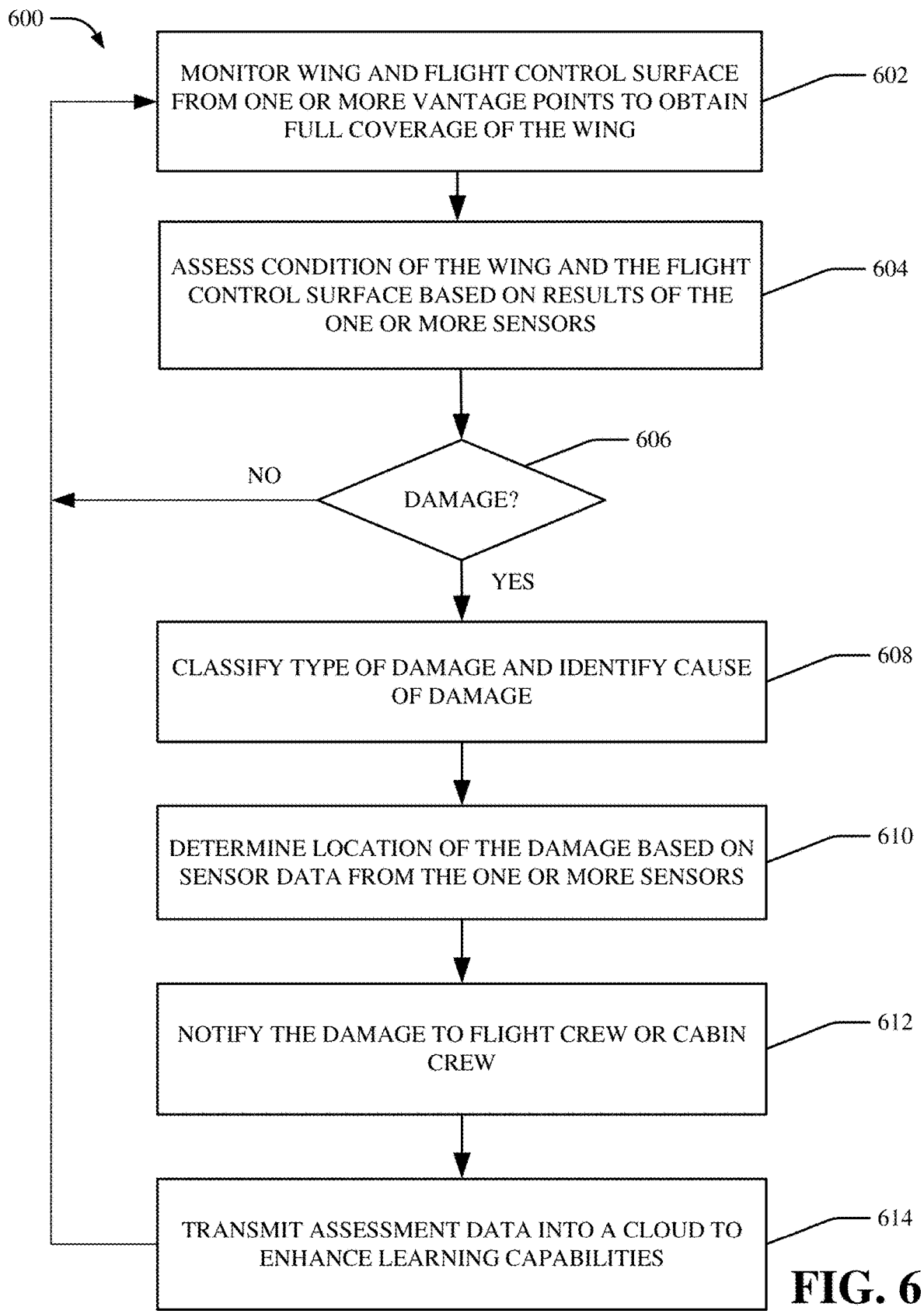

FIG. 6 illustrates an example, non-limiting computer-implemented method 600 facilitating automating fault isolation of flight control surfaces and damage detection of aircraft in accordance with one or more embodiments described herein. Repetitive description of like elements employed in other embodiments described herein is omitted for sake of brevity. At 602, the computer-implemented method 600 can comprise monitoring (e.g., via the sensors 106) wing and flight control surface from one or more vantage points to obtain full coverage of the wing. At 604, the computer-implemented method 600 can comprise assessing (e.g., via the machine vision component 108) condition of the wing and the flight control surface based on results of the one or more sensors 106. At 606, the computer-implemented method 500 can comprise determining (e.g., via the machine vision component 108) whether there is damage. If no, the process returns to 602. If yes, the process proceeds to 608. At 608, the computer-implemented method 600 can comprise classifying (e.g., via the machine vision component 108) type of damage and identifying (e.g., via the machine vision component 108) cause of damage. At 610, the computer-implemented method 600 can comprise determining (e.g., via the machine vision component 108) location of the damage based on sensor data from the one or more sensors. At 612, the computer-implemented method 600 can comprise notifying the damage to flight crew or cabin crew. At 614, the computer-implemented method 600 can comprise transmitting (e.g., via the machine vision component 108) assessment data into a cloud to enhance learning capabilities.

Figure 7:
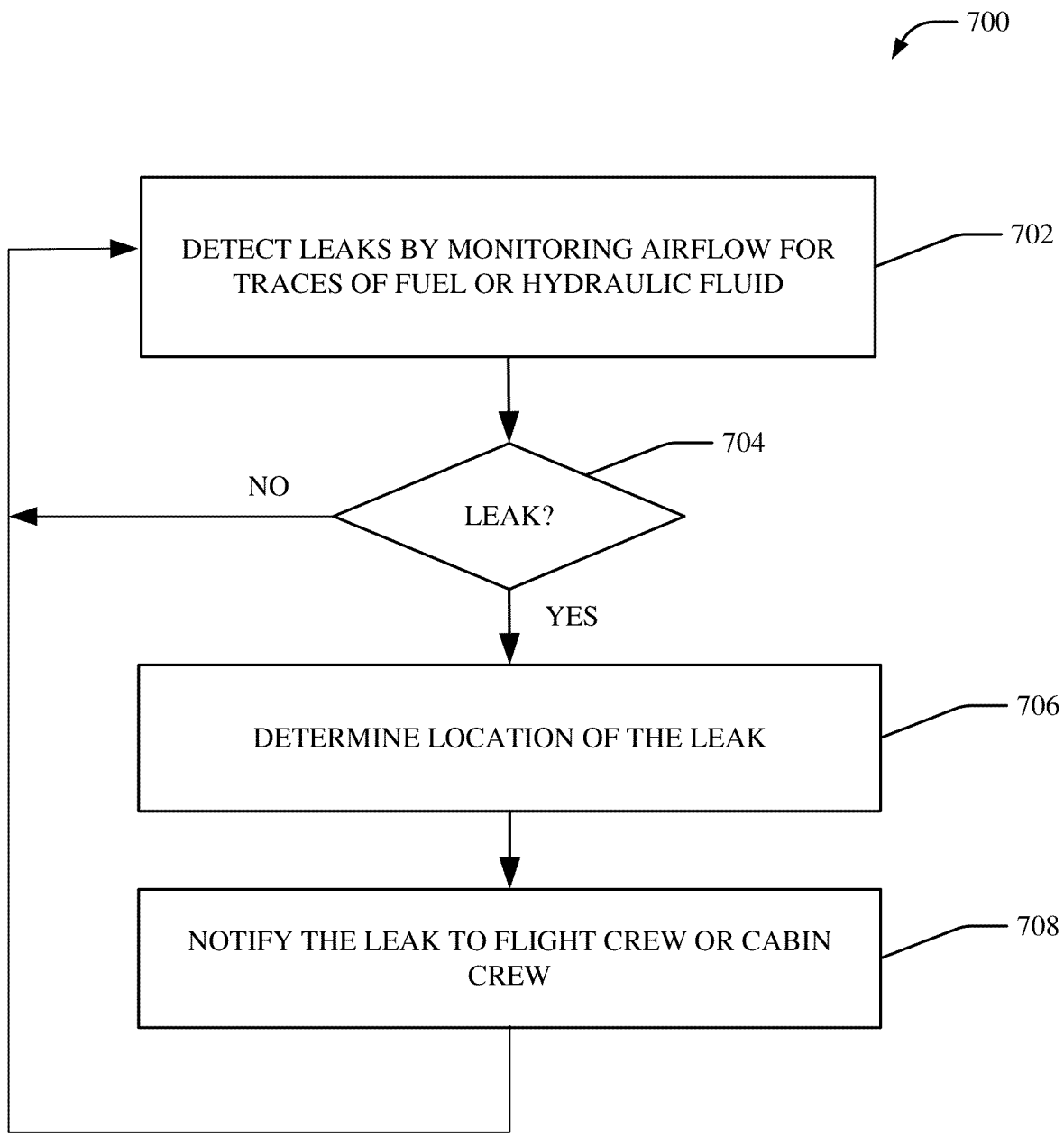

FIG. 7 illustrates an example, non-limiting computer-implemented method 700 facilitating automating fault isolation of flight control surfaces and damage detection of aircraft in accordance with one or more embodiments described herein. Repetitive description of like elements employed in other embodiments described herein is omitted for sake of brevity. At 702, the computer-implemented method 700 can comprise detecting (e.g., via the spectrographic component 110) leaks by monitoring airflow for traces of fuel or hydraulic fluid. At 704, the computer-implemented method 700 can comprise determining (e.g., via the spectrographic component 110) whether there is a leak of fuel or hydraulic fluid. If no, the process returns to 702. If yes, the process proceeds to 706. At 706, the computer-implemented method 700 can comprise determining (e.g., via the spectrographic component 110) location of the leak. At 708, the computer-implemented method 700 can comprise notifying (e.g., via the notification component 202) the leak to the flight crew or cabin crew.

Figure 8:
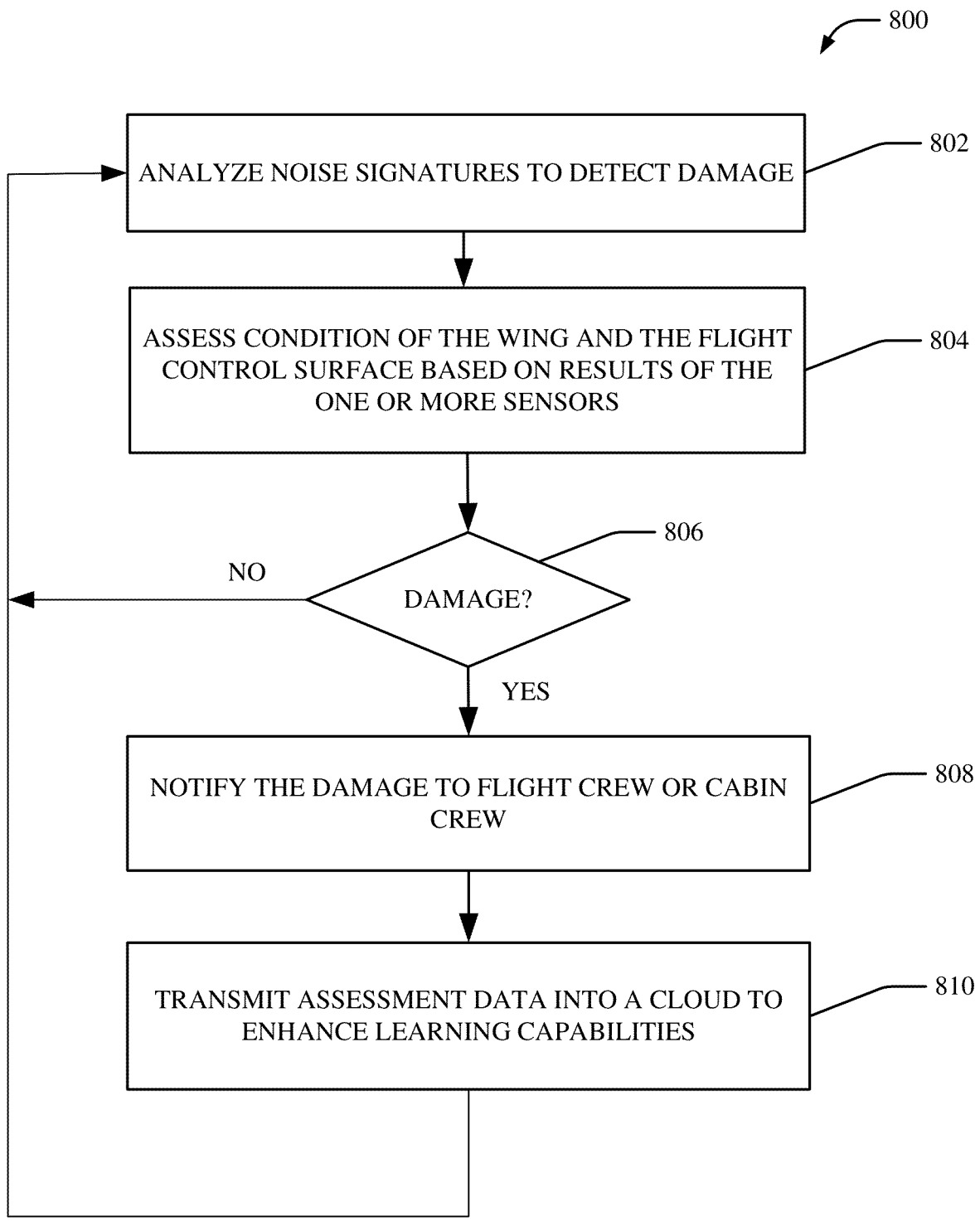

FIG. 8 illustrates an example, non-limiting computer-implemented method 800 facilitating automating fault isolation of flight control surfaces and damage detection of aircraft in accordance with one or more embodiments described herein. Repetitive description of like elements employed in other embodiments described herein is omitted for sake of brevity. At 802, the computer-implemented method 800 can comprise analyzing (e.g., via the sensors 106) noise signature to detect damage. At 804, the computer-implemented method 800 can comprise assessing (e.g., via the machine vision component 108) condition of the wing and the flight control surface based on results of the one or more sensors 106. At 806, the computer-implemented method 800 can comprise determining (e.g., via the machine vision component 108) whether there is damage to the wing or flight control surface. If no, the process returns to 802. If yes, the process proceeds to 808. At 808, the computer-implemented method 800 can comprise notifying (e.g., via the notification component 202 the damage to the flight crew or cabin crew. At 810, the computer-implemented method 800 can comprise transmitting (e.g., via machine vision component 108) assessment data into a cloud to enhance learning capabilities.

Figure 9:
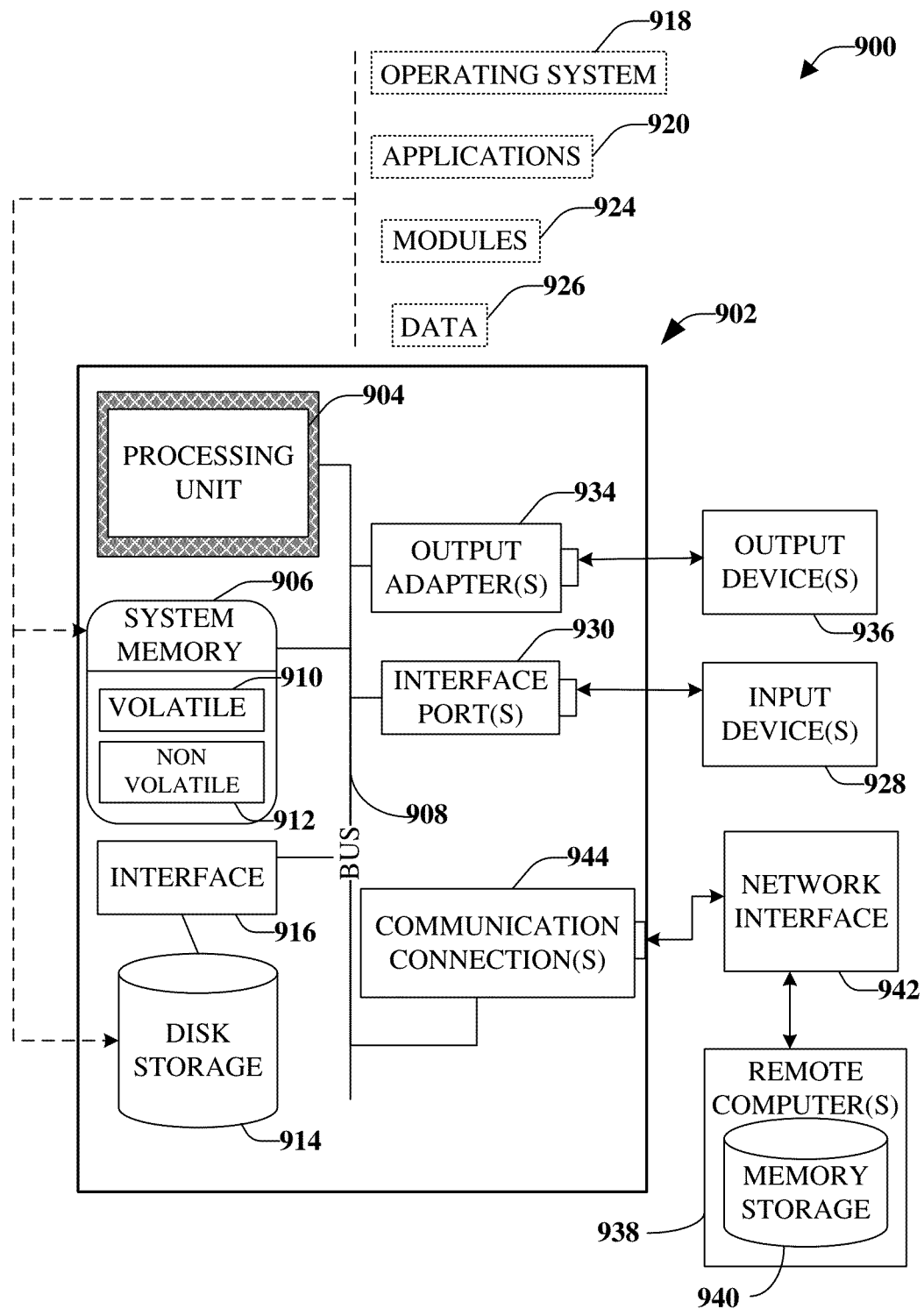
FIG. 9 illustrates an example, non-limiting schematic block diagram of a computing environment in accordance with this specification in accordance with various aspects disclosed herein.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity.

With reference to FIG. 9, a suitable environment 900 for implementing various aspects of the claimed subject matter includes a computer 902. The computer 902 includes a processing unit 904, a system memory 906, a codec 905, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 902 may also include removable/non-removable, volatile/non-volatile computer storage media. FIG. 9 illustrates, for example, a disk storage 914. Disk storage 914 includes, but is not limited to, devices like a magnetic disk drive, solid state disk (SSD) floppy disk drive, tape drive, Zip drive, LS-110 drive, flash memory card, or memory stick. In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software, software in execution, hardware, and/or software in combination with hardware that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 824, and program data 826, such as the boot/shutdown transaction table and the like, stored either in system memory 806 or on disk storage 814. It is to be appreciated that the claimed subject matter can be implemented with various operating systems or combinations of operating systems. For example, applications 820 and program data 826 can include software implementing aspects of this disclosure.

A user enters commands or information into the computer 802 through input device(s) 828, non-limiting examples of which can include a pointing device such as a mouse, trackball, stylus, touch pad, keyboard, microphone, joystick, game pad, satellite dish, scanner, TV tuner card, digital camera, digital video camera, electronic nose, web camera, and any other device that allows the user to interact with computer 902. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN), wide-area networks (WAN), and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, wired and wireless Ethernet cards, hubs, and routers.

Figure 10:
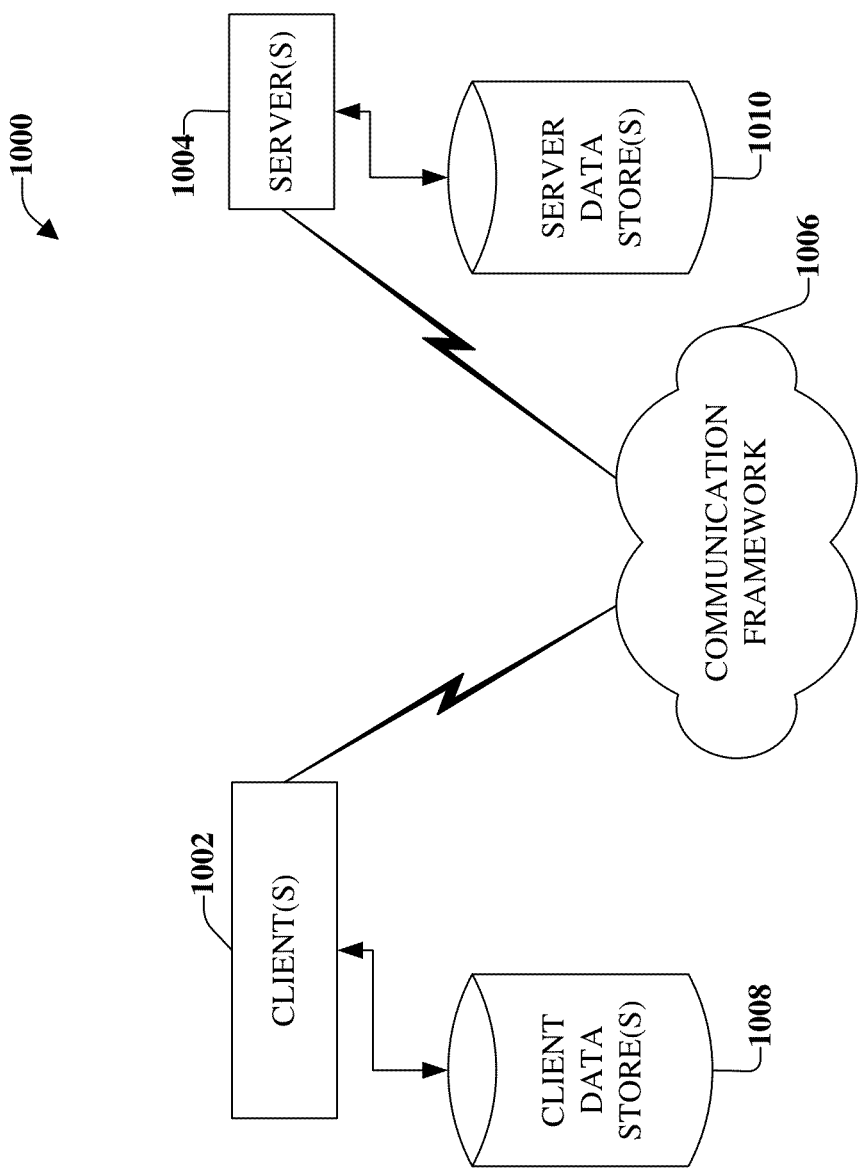
FIG. 10 illustrates an example, non-limiting block diagram of a computer operable to execute various implementations described herein.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is to be appreciated, that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein (e.g., detection components, input components, sample delivery components, and the like) can include electrical circuit(s) that can include components and circuitry elements of suitable value in order to implement the aspects of this innovation(s). Furthermore, it can be appreciated that many of the various components can be implemented on one or more integrated circuit (IC) chips. In one exemplary implementation, a set of components can be implemented in a single IC chip. In other exemplary implementations, one or more of respective components are fabricated or implemented on separate IC chips.

What has been described above includes examples of the implementations of the present invention. It is, of course, not possible to describe every conceivable combination of components or methodologies for purposes of describing the claimed subject matter, but it is to be appreciated that many further combinations and permutations of this innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than or equal to 11" can include any and all sub-ranges between (and including) the minimum value of zero and the maximum value of 11, that is, any and all sub-ranges having a minimum value of equal to or greater than zero and a maximum value of equal to or less than 11, e.g., 1 to 5. In certain cases, the numerical values as stated for the parameter can take on negative values.

In addition, while a particular feature of this innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification are not necessarily all referring to the same implementation. Furthermore, the particular features, structures, or characteristics may be combined in any suitable manner in one or more implementations.

Further, references throughout this specification to an "item," or "file," means that a particular structure, feature or object described in connection with the implementations are not necessarily referring to the same object. Furthermore, a "file" or "item" can refer to an object of various formats.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. While separate components are depicted in various implementations, it is to be appreciated that the components may be represented in one or more common component. Further, design of the various implementations can include different component placements, component selections, etc., to achieve an optimal performance. Further, a "device" can come in the form of specially designed hardware; generalized hardware made specialized by the execution of software thereon that enables the hardware to perform specific function (e.g., media item aggregation); software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed:

1. A system, comprising:
   a memory that stores computer executable instructions; and
   a processor, operably coupled to the memory, and that executes the computer executable instructions stored in the memory, which causes the processor to:
   monitor, via execution of a plurality of sensors, a wing of an aircraft and a flight control surface of the wing, wherein the plurality of sensors are positioned at a plurality of respective vantage points on the aircraft to obtain full coverage of the wing;
   assess, via execution of a machine learning algorithm, a condition of the wing and the flight control surface, wherein the machine learning algorithm receives as input data that is produced by the plurality of sensors; and
   detect, via execution of a spectrometer, fuel leaks or hydraulic fluid leaks, wherein the spectrometer is positioned on a downstream outer surface of the wing and is configured to monitor airflow for traces of fuel or hydraulic fluid.

2. The system of claim 1, wherein the machine learning algorithm uses inputs from the flight control surface to compare actual deflection and demanded deflection to identify location of failure as a function of deviation of the actual deflection from the demanded deflection.

3. The system of claim 1, wherein the plurality of sensors monitor landing gear.

4. The system of claim 1, wherein the plurality of sensors are cameras that employ infrared for vision analysis in low visibility conditions.

5. The system of claim 1, wherein the plurality of sensors utilize at least one of: lidar, radar or ultrasound.

6. The system of claim 1, wherein the plurality of sensors are electromechanical sensors or digital sensors.

7. The system of claim 1, wherein the plurality of sensors are acoustic sensors that monitor sound signature of the wing and the flight control surface.

8. The system of claim 1, wherein the machine learning algorithm classifies type of damage and identifies cause of damage.

9. The system of claim 8, wherein the machine learning algorithm determines location of the damage based on sensor data from the plurality of sensors.

10. The system of claim 9, wherein the computer executable instructions are further executable to cause the processor to notify the damage to flight crew or cabin crew.

11. The system of claim 1, wherein the machine learning algorithm transmits assessment data into a cloud to enhance learning capabilities.

12. A computer-implemented method, comprising:
monitoring, by a system operatively coupled to a processor and via execution of a plurality of sensors, a wing of an aircraft and a flight control surface of the wing, wherein the plurality of sensors are positioned at a plurality of respective vantage points on the aircraft to obtain full coverage of the wing;
assessing, by the system and via execution of a machine learning algorithm, a condition of the wing and the flight control surface, wherein the machine learning algorithm receives as input data that is produced by the plurality of sensors; and
detecting, by the system and via execution of a spectrometer, fuel leaks or hydraulic fluid leaks, wherein the spectrometer is positioned on a downstream outer surface of the wing and is configured to monitor airflow for traces of fuel or hydraulic fluid.

13. The computer-implemented method of claim 12, wherein the assessing the condition of the wing and the flight control surface comprises classifying type of damage and identifying cause of damage.

14. The computer-implemented method of claim 13, wherein the assessing the condition of the wing and the flight control surface comprises determining location of the damage based on sensor data from the plurality of sensors.

15. The computer-implemented method of claim 12, further comprising notifying the damage to flight crew or cabin crew.

16. The computer-implemented method of claim 12, wherein the assessing the condition of the wing and the flight control surface comprises transmitting assessment data into a cloud to enhance learning capabilities.

17. A computer program product for facilitating automating fault isolation of flight control surfaces and damage detection of aircraft, the computer program product comprising a non-transitory computer readable storage medium having program instructions embodied therewith, the program instructions executable by a processor to cause the processor to:
monitor, via execution of a plurality of sensors, a wing of an aircraft and a flight control surface of the wing, wherein the plurality of sensors are positioned at a plurality of respective vantage points on the aircraft to obtain full coverage of the wing;
assess, via execution of a machine learning algorithm, a condition of the wing and the flight control surface, wherein the machine learning algorithm receives as input data produced by the plurality of sensors; and
detect, via execution of a spectrometer, fuel leaks or hydraulic fluid leaks, wherein the spectrometer is positioned on a downstream outer surface of the wing and is configured to monitor airflow for traces of fuel or hydraulic fluid.

18. The computer program product of claim 17, wherein the program instructions are further executable to cause the processor to:
classify type of damage and identify cause of damage.

19. The computer program product of claim 18, wherein the program instructions are further executable to cause the processor to:
determine location of the damage based on sensor data from the plurality of sensors.

20. The computer program product of claim 17, wherein the program instructions are further executable to cause the processor to:
transmit assessment data into a cloud to enhance learning capabilities.

* * * * *